(12) United States Patent
Chockalingam et al.

(10) Patent No.: US 10,936,545 B1
(45) Date of Patent: Mar. 2, 2021

(54) AUTOMATIC DETECTION AND BACKUP OF PRIMARY DATABASE INSTANCE IN DATABASE CLUSTER

(71) Applicant: EMC Corporation, Hopkinton, MA (US)

(72) Inventors: Elango Chockalingam, Chennai (IN); Manjesh Venkatanarayana Chikkanayakanahally, Bangalore (IN); Nikhil Ambastha, Bangalore (IN); Krishnendu Bagchi, Pune (IN); Vedavathi Ht, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 959 days.

(21) Appl. No.: 14/137,850

(22) Filed: Dec. 20, 2013

(51) Int. Cl.
| | | |
|---|---|---|
| *G06F 16/11* | (2019.01) | |
| *G06F 16/174* | (2019.01) | |
| *G06F 11/14* | (2006.01) | |
| *G06F 16/21* | (2019.01) | |
| *G06F 16/27* | (2019.01) | |
| *G06F 16/28* | (2019.01) | |

(52) U.S. Cl.
CPC ........ *G06F 16/174* (2019.01); *G06F 11/1448* (2013.01); *G06F 16/11* (2019.01); *G06F 16/122* (2019.01); *G06F 16/128* (2019.01); *G06F 16/217* (2019.01); *G06F 16/27* (2019.01); *G06F 16/288* (2019.01)

(58) Field of Classification Search
CPC ............. G06F 11/1458; G06F 2201/80; G06F 11/2023; G06F 17/30221; G06F 17/30575; G06F 17/30581; G06F 2201/84; G06F 16/122; G06F 16/128; G06F 16/288; Y10S 707/99953
See application file for complete search history.

(56) References Cited

U.S. PATENT DOCUMENTS

| | | | | |
|---|---|---|---|---|
| 6,393,485 | B1 * | 5/2002 | Chao .................... | G06F 11/1482 709/231 |
| 9,275,060 | B1 * | 3/2016 | Supekar ................ | G06F 16/122 |
| 2007/0192554 | A1 * | 8/2007 | Higaki .................. | G06F 3/0607 711/162 |
| 2011/0161297 | A1 * | 6/2011 | Parab .................. | G06F 11/1453 707/646 |
| 2013/0166863 | A1 * | 6/2013 | Buragohain ........ | G06F 11/1446 711/162 |
| 2013/0173554 | A1 * | 7/2013 | Ubukata ............. | G06F 11/1448 707/640 |
| 2014/0258771 | A1 * | 9/2014 | Xie ..................... | G06F 11/2005 714/4.11 |

* cited by examiner

*Primary Examiner* — Tamara T Kyle
*Assistant Examiner* — Berhanu Mitiku
(74) *Attorney, Agent, or Firm* — Womble Bond Dickinson (US) LLP

(57) ABSTRACT

An improved backup utility allows the ability to maintain full backup and incremental backup log chains, even when databases which are part of a clustered database group are backed up from different database nodes and instances. In these embodiments, this is implemented by storing the backup of the databases from both primary and secondary (failover) nodes under a single backup client which is the cluster identifier. The backup is indexed against a constant database instance based on a user configured save set. In other words, regardless of which node is primary at the time of the backup, the backup is made against a constant backup instance.

21 Claims, 8 Drawing Sheets

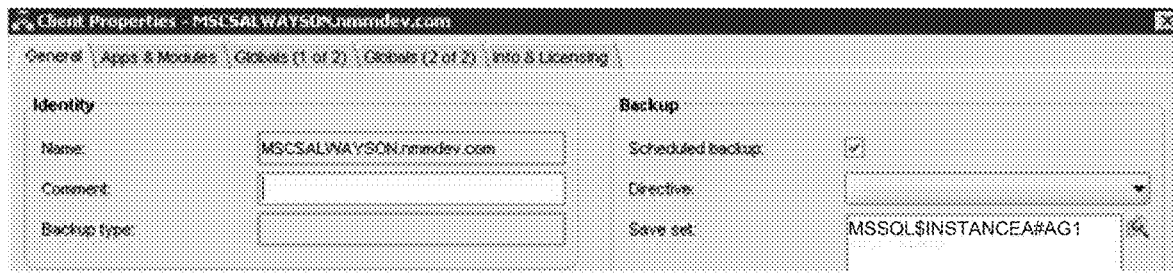
FIG 4-A
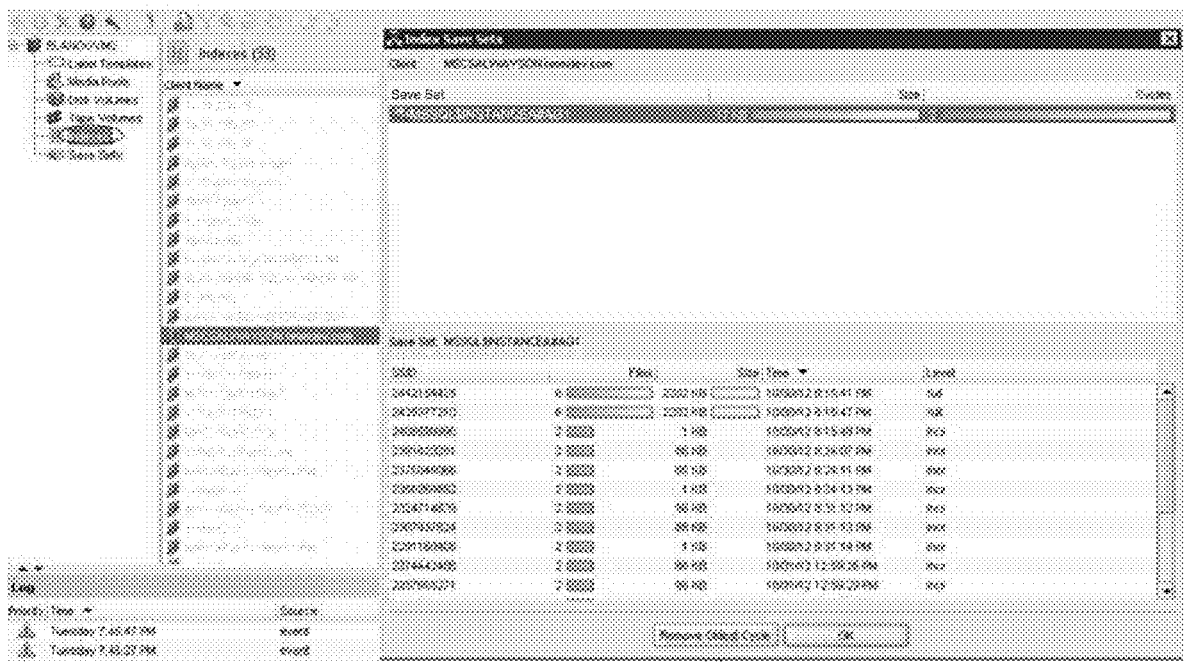
FIG 4-B

```
┌─────────────────────────────────────────────────────────────┐
│ Receive backup command at preferred node from secondary     │
│ node, comprising at least a cluster identifier, a database  │
│ group identifier, a backup type, and optionally a backup    │
│ instance identifier                                         │
│ 602                                                         │
└─────────────────────────────────────────────────────────────┘
                              │
                              ▼
┌─────────────────────────────────────────────────────────────┐
│ Detect the save set based on the identifying information    │
│ provided in the backup command                              │
│ 604                                                         │
└─────────────────────────────────────────────────────────────┘
                              │
                              ▼
┌─────────────────────────────────────────────────────────────┐
│ Create backup of database instance identified in the backup │
│ command on current node, including the recovery log, where  │
│ the backup is of the backup type in the backup command      │
│ 606                                                         │
└─────────────────────────────────────────────────────────────┘
                              │
                              ▼
┌─────────────────────────────────────────────────────────────┐
│ Designate backup with instance identifier provided by the   │
│ user backup command                                         │
│ 608                                                         │
└─────────────────────────────────────────────────────────────┘
                              │
                              ▼
┌─────────────────────────────────────────────────────────────┐
│ Send backup to cluster backup server                        │
│ 610                                                         │
└─────────────────────────────────────────────────────────────┘
```

FIG 6

AUTOMATIC DETECTION AND BACKUP OF PRIMARY DATABASE INSTANCE IN DATABASE CLUSTER

FIELD OF THE INVENTION

Embodiments of the present invention relate generally to data storage systems. More particularly, embodiments of the invention relate to the automatic detection and backup of the preferred database instance within a clustered database system.

BACKGROUND

A computer cluster consists of a set of loosely connected or tightly connected computers that work together so that in many respects they can be viewed as a single system. The components of a cluster are usually connected to each other through fast local area networks ("LAN"), with each node running its own instance of an operating system. Alternatively, clusters may be virtual instances running on one or more computers. Clusters are usually deployed to improve performance and availability over that of a single computer.

The nodes on such a computer cluster can each support a database server instance. One or more database groups can be spread across these clustered database server instances. For each database group, one of the database server instances within the cluster acts as the primary or active database instance for the group, and one or more other clustered database server instances acts as the set of failover instances for the group. Typically, the failover instances receive the transactions from the active instance and synchronize with them, either synchronously or asynchronously. Upon an automatic failover due to a malfunction, or upon the manual initiation of a switchover, one of the failover instances becomes the active instance and is able to seamlessly resume the operation of that database group, since it has synchronized the transactions of the active instance up to the failover or switchover point.

In order to back up such a clustered database group, a user can run a backup process on each of the cluster instances which the database group resides upon. However, by doing this, a user creates multiple backups for each of the instances on which the group resides. This results in multiple redundant backups of the same data, wasting storage mace. Furthermore, as each instance of the database group is backed up at a different point in time and is unique to that instance, restoring the group as a whole is impossible using these multiple backups.

A particular example of such a clustered system is the AlwaysOn™ SQL Server Availability Groups developed by Microsoft® Corporation of Redmond, Wash. AlwaysOn™ is a new and important feature of the SQL Server 2012 release and it uses Windows clustering resources to identify the availability of the database and failover the database to achieve the high availability capability for the databases. Every database participating in the failover clustering is associated with a Windows™ cluster group. Each AlwaysOn™ group has an ownership as Primary in one node and Secondary in one or more cluster nodes (with a maximum of four nodes).

For SQL Server AlwaysOn™, a major problem with the current design of backup utilities is that the backup from a node will always be taken from that particular SQL node and if the backup preference changes to another SQL node then a backup utility will back up the AlwaysOn™ database as a full back up again under the reference of a new backup instance name. The backup preference may change when a user directs the backup utility to back up a node which has become the Primary node but which was a Secondary node previously. The backup preference may also change when the user changes the preferred backup setting in the AlwaysOn™ group. This leads a user to maintain multiple copies of backups and versions of the same database in different backup instance contexts. This also makes it impossible to achieve the any point in time restore of a AlwaysOn™ group level backup, since multiple version of the group's databases are maintained under different backup instance names and contexts.

A particular example of a backup utility is Networker™ Modules for Microsoft® Applications (NMM), which is developed by EMC® Corporation of Hopkinton, Mass. NMM leverages volume snapshot service (VSS) and virtual device interface (VDI) technology to protect Microsoft SQL Server application data. NMM supports Microsoft applications such as Exchange™, SharePoint™ and Hyper-V™ via VSS technology, and through VDI technology NMM supports Microsoft® SQL Server.

BRIEF DESCRIPTION OF THE DRAWINGS

Embodiments of the invention are illustrated by way of example and not limitation in the figures of the accompanying drawings in which like references indicate similar elements.

FIGS. 4-A and 4-B illustrate exemplary interfaces exposed to a user for the backup system according to one embodiment of the invention.

FIG. 6 is a flow diagram illustrating the receipt of a generated backup command on one cluster node according to one embodiment of the invention.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Automatic detection and backup of the preferred database instance in a database cluster is described herein. As described above, the current art does not provide a backup utility which can properly backup a clustered database instance and restore the same. According to some embodiments, an improved backup utility allows the ability to maintain full backup and incremental backup log chains, even when databases which are part of a clustered database group, such as a Microsoft® SQL Server AlwaysOn™ group, are backed up from different database nodes and instances, such as SQL named or default instances. In these embodiments, this is implemented by storing the backup of the databases from both primary and secondary (i.e. failover) nodes under a single backup client which may be identified by a backup identifier, such as the cluster name, e.g. a Microsoft® Windows™ cluster name. The backup is indexed against a constant database instance based on a user configured save set. In other words, regardless of which node is primary or preferred at the time of the backup, the backup is made against a constant backup instance. Note that throughout this application, a Microsoft® SQL Server AlwaysOn™ server is utilized as an example of redundant failover database servers. However, the techniques described herein can be applied to other database technologies as well.

Figure 1:
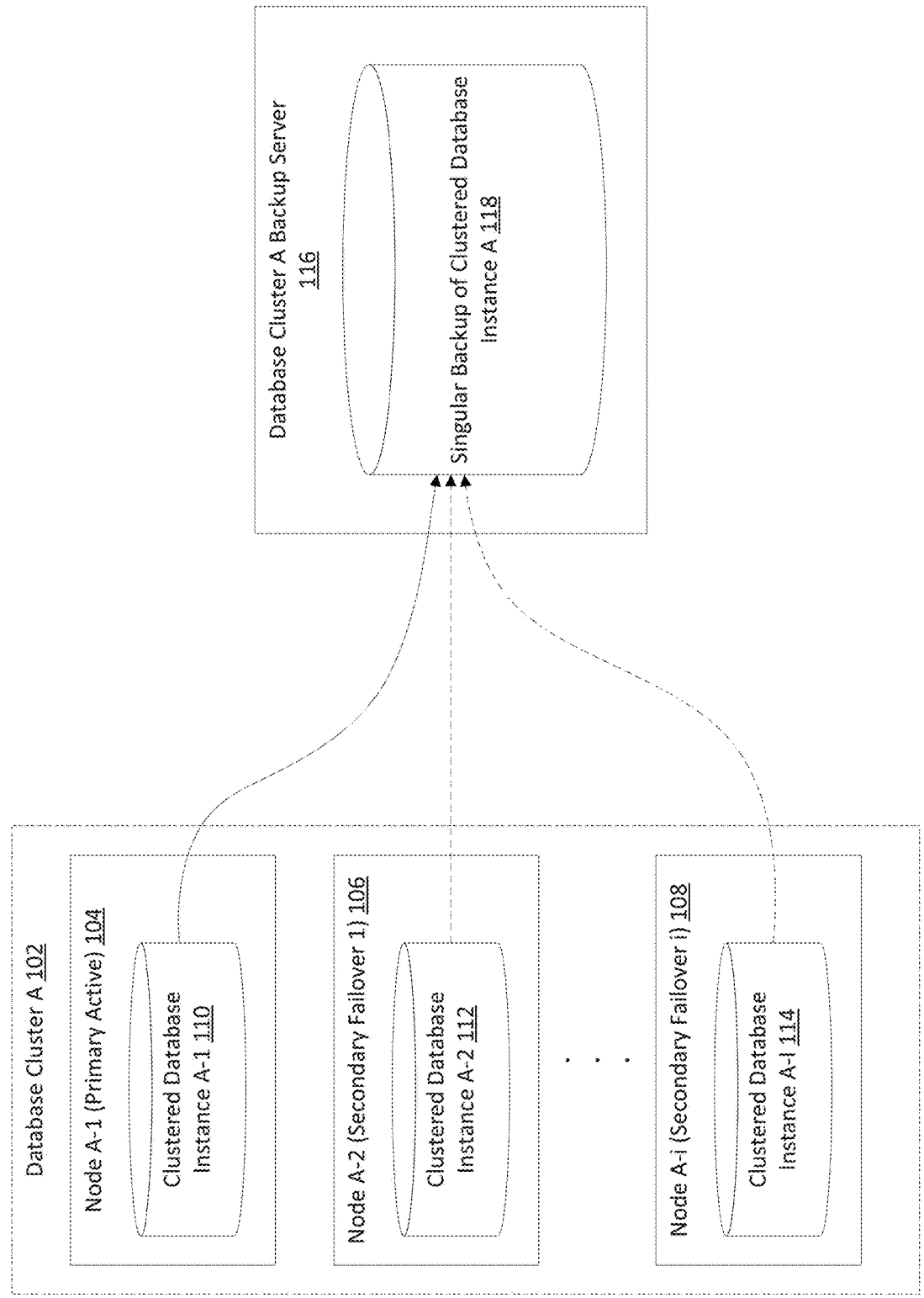
FIG. 1 is a block diagram illustrating a backup system according to one embodiment of the invention.

FIG. 1 is a block diagram illustrating a backup system according to one embodiment of the invention. The database cluster A 102 comprises a primary node A-1 104 which in the diagram is illustrated to be acting as the current active node. In other words, the clustered database instance A-1 110 residing on node A-1 is in a read write mode and communicates with applications which may access the database. The database cluster A 102 also contains at least one secondary node, which acts as a failover instance for the primary node A-1. The secondary nodes are represented by node A-2 thru node A-i (106-108) in the block diagram of FIG. 1. The clustered database instances A-2 thru A-I (112-114) in these nodes, while in the failover secondary mode, communicate with the clustered database instance A-1 110 in the primary node A-1 104 in order to synchronize transactions which occur on the database instance A-1. While in the secondary failover mode, the nodes may be accessed in a read only mode or cannot be accessed at all. In the event of a failure, or upon a manual user switchover, one of the secondary nodes becomes the primary active node and the node which previously acted as the primary active node becomes a secondary node or is disabled. After the switch, the new primary node assumes the responsibilities of the old primary node. To outside applications, this transition is designed to be seamless such that any interruptions are minimized.

A particular example of such a clustered system is the Microsoft® AlwaysOn™ SQL Server. AlwaysOn™ is a new and important feature of the SQL Server 2012 release and it uses Microsoft Windows clustering resources to identify the availability of the database and failover the database to achieve high availability capability for the databases. Every database participating in the failover clustering is associated with a Microsoft Windows cluster group. Each AlwaysOn group has an ownership as Primary in one node and Secondary in one or more cluster nodes (with a maximum of four nodes).

Although there are at least two database instances the cluster, all instances are backed up to a single backup represented by the backup of clustered database instance A 118 located at database cluster A backup server 116. When one of the nodes 104-108 receives a user command to back up data within the instance residing on the node, backup modules on the same node (not pictured) query the database instance on the same node to see if that database instance is acting as the preferred backup instance. The preferred instance may either be the primary instance or may be one of the other instances in the cluster as specified in the configuration settings for the cluster. If that particular database instance is currently acting as the preferred instance, then the backup module backs up the requested data within that database and sends it to the backup server 116. However, if that database instance is not the preferred instance, then the backup module determines what the current preferred instance and node is, and communicates with and requests the backup module on that node to back up the requested data on the active instance and send it to the backup server 116. Furthermore, if the preferred node is set to the primary active instance, when the primary active instance fails, the backup system will be able to detect this failure and automatically backup the database instance from the new primary instance.

With such a backup system, the user does not need to know the internal settings like which node is the primary or preferred node for backup among the various cluster nodes, which is very much dynamic in the cluster environment. Even if the preferred node changes from time to time, the backup system ensures that the backup is performed on the correct preferred node and also ensures that a single recovery log chain is kept for the restore. This makes it possible to restore the backup of clustered databases groups which are backed-up from different database instances and nodes.

This system makes the user's life easier and improves the performance of the database replication environment, since only one node, the preferred node, is involved in the federated backup and the other nodes are not impacted. This improves the performance of the applications which are deployed in the replicated environment.

Figure 2:
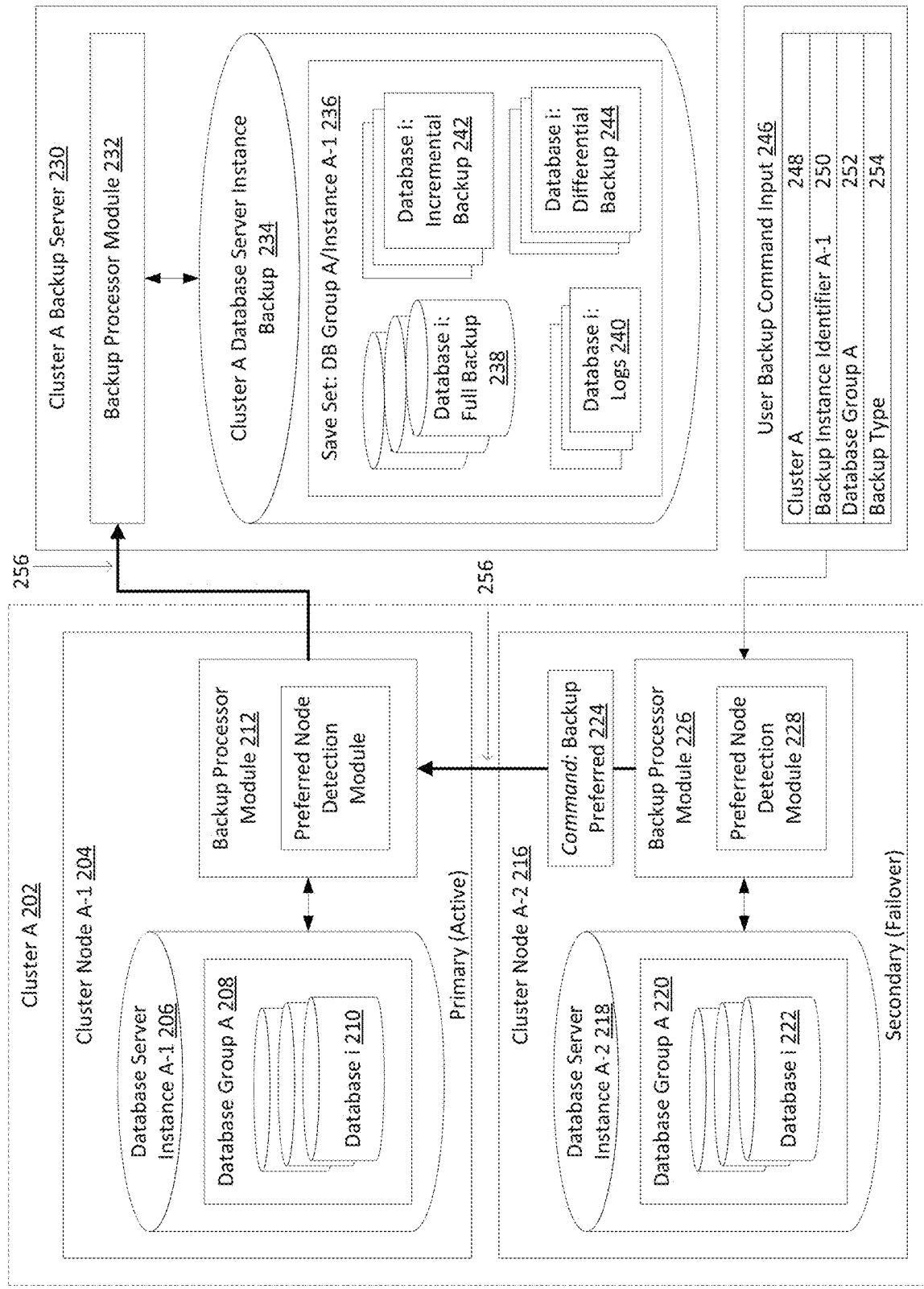
FIG. 2 is a detailed block and flow diagram illustrating the backup system according to one embodiment of the invention.

FIG. 2 is a detailed block and flow diagram illustrating the backup system according to one embodiment of the invention. In the embodiment depicted in FIG. 2, cluster node A-1 204 is the primary active and preferred node and cluster node A-2 216 is the secondary failover node, and both nodes are part of cluster A 202. As noted above, in other embodiments, a cluster can have more than one secondary cluster node. However, FIG. 2 shows a single failover node for illustration purposes.

Each database server instance, e.g. database instance A-1 206, contains at least one database group, such as database group A 208. In some embodiments, an instance contains multiple database groups. Each group represents a set of databases, such as database i 202, which have been uniformly replicated over the nodes and instances of a cluster. For example, in FIG. 2, the databases within database group A 202 are replicated over database server instances A-1 B08 and A-2 218. In one embodiment, the set of database instances which one database group is replicated by is not the same as the set of database instances which another database group is replicated by, however the two groups share some database instances in common.

The user provides user backup command input 246 to cluster node A-2 216. In other embodiments, this user command 246 is sent to the primary (or preferred) cluster node (e.g. cluster node A-1 204), or to the backup server (e.g. cluster A backup server 230). The command 246 identifies the cluster identifier (e.g. name) 248 and the database group 252, and selects an instance identifier 250 which is used to identify the backup save set 236, as well as the backup type 254. In some embodiments, the command 246 does not include an instance identifier 250. In some embodiments, the backup type comprises a full backup type, an incremental backup type, and/or a differential backup type. Once the node 216 receives the command, a backup processing module 226 located on the node receives the command for processing. In some embodiments, this module is implemented in software, hardware, or a combination thereof.

The backup processing module 226 contains functionality to determine whether the node 216 and the database server instance A-2 218 is the preferred backup node or instance for the database group identified in the user command 246. In some embodiments, this functionality is achieved via preferred node detection module 228. This module 228 may be implemented in software, hardware, or a combination thereof. In the scenario depicted by FIG. 2, cluster node A-2 216 and the associated database server instance A-2 218 is not the preferred or primary instance.

As the user command did not arrive on the preferred instance, in one embodiment, the backup module 224 determines which node is currently acting as the preferred node and sends an automatically generated command 224 to the preferred node to request that database group A 208 on database server instance A-1 206 is backed up. In some embodiments, the user command 246 has further requested a specific database, such as database i 210 within database group A 208, to be backed up. In such a case, the automatically generated command 224 requests the preferred backup node to back up that particular database. Furthermore, in some embodiments, this command 224 requests that this backup be labeled according to the backup label 248 provided in the user command 246.

The backup processing module 212 which resides on cluster node A-1 204 and which is analogous to the backup module 226 previously described receives the backup command 224. In response to the command 224, backup module 212 processes the backup of the requested database group specified in 252 and sends it to the backup server 230. This backup is labeled with the group identifier, such as 248, and the instance identifier, such as 250, which are specified in the user command 246. This label stays the same regardless of which database instance the data within database group A is retrieved from for backup. In some embodiments, the save set for the backup has been previously created, and the backup processing module 212 instead detects the proper save set from the existing save set. The backup is sent to the cluster A database server instance backup 234 and is stored as the save set 236 which is labeled as previously described.

In some embodiments, this backup is performed by a slave process. In other embodiments, the backup module 212 notifies the backup processing module 232 on the backup server 230 to back up database group A 208 on the database server instance A-1 206, and in response, the backup server's backup module 232 spawns a slave process to retrieve the backup from the primary node. The backup module 232 on the backup server 230 may either be a dedicated hardware module, or be contained in computer readable memory to be executed by a processor within the backup server 230.

The backup, which is stored in the save set 236, comprises at least one of three backup types. These three include full backups 238, incremental backups 242, and/or differential backups 244. A full backup, such as the full backup of database i 238, is a backup which contains an entire copy of the database. An incremental backup, such as the incremental backup of database i 242, is a backup which backs up portions, e.g. data files, of the database which have changed since the last full or incremental backup, and requires an initial full backup of the database. A differential backup, such as the differential backup of database i 244, is a backup of the portions, e.g. data files, of the database which have changed since last full backup, and not since the last differential backup (or incremental backup). The transaction logs for each database are also backed up in the save set at 240. The transaction or recovery logs for a database contain a log of all transactions since the last full, incremental, or differential backup and can be used to restore the database up to a point in time at which the transaction logs end. The backup type indicator 254 provided by the user command 246 is used by the backup system to determine what type of backup to create for the database group. Each save set includes backups for all databases which are part of a particular database group and their accompanying log files.

The save set is associated with the database group identifier, e.g. database group A, as well as an instance identifier (e.g. name) which is provided by the user backup command 246. However, as noted previously, only a single save set is associated with each database group, and this same save set is used to save the backups of databases within the database group from the active instance, regardless of which instance is acting as the active instance. Thus, incremental and differential backups for databases within the save set are backed up against the previous full or incremental backups within the save set, regardless of which instance or cluster the particular backup was taken from. Note that a name is utilized as an example of an identifier for identifying a database cluster database instance, etc. However, other data or information may also be used as an identifier.

Figure 3:
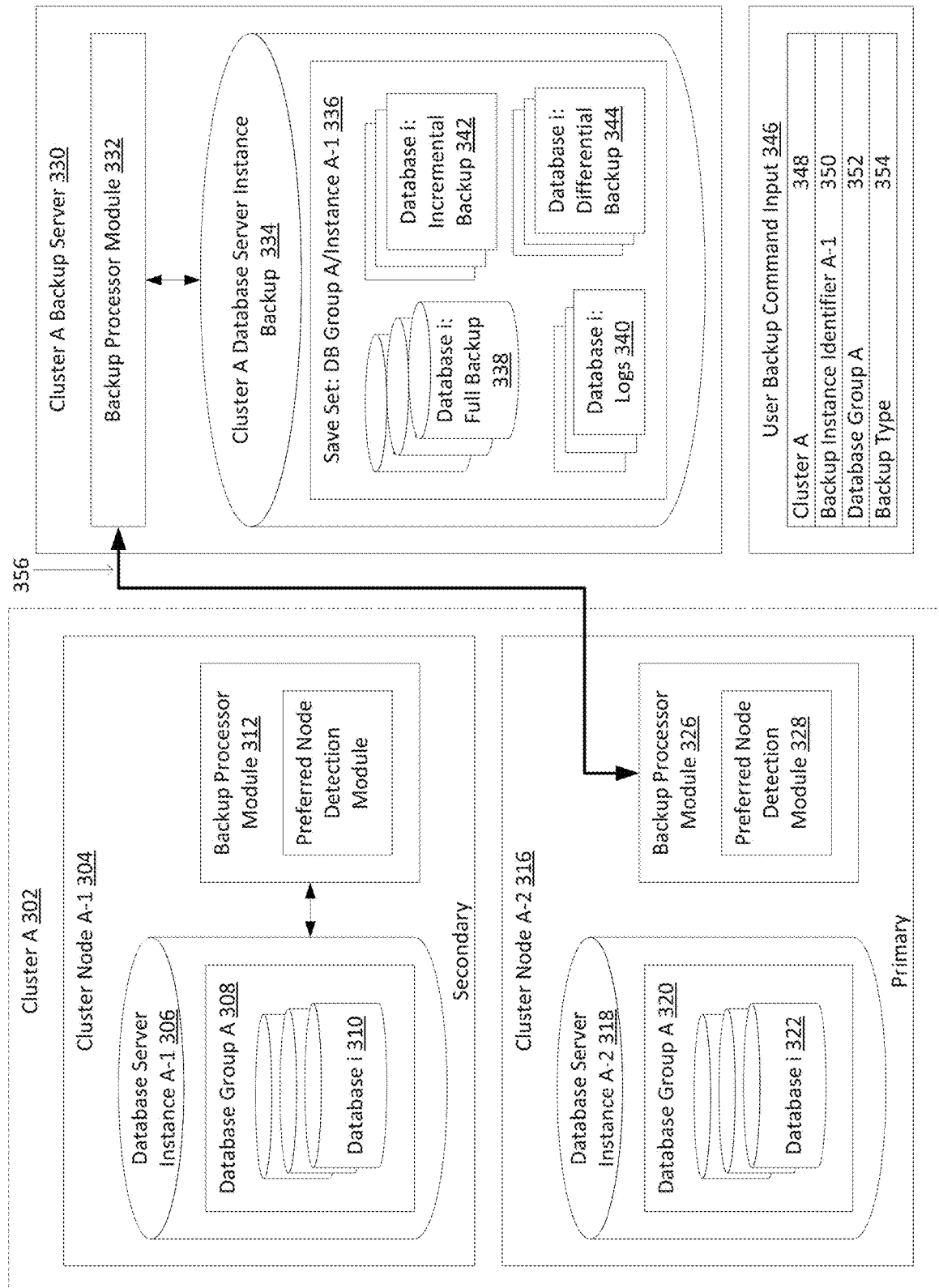
FIG. 3 is a detailed block and flow diagram illustrating an alternative flow of the backup system according to one embodiment of the invention.

FIG. 3 is a detailed block and flow diagram illustrating the backup system according to another embodiment of the invention. The diagram in FIG. 3 is largely the same as the one in FIG. 2, however, node A-1 304 has become a secondary node and node A-2 316 has become the primary and preferred active node. This may have occurred due to a manual switchover or due to a failure in node A-1. Thus, the database instance A-2 318 is now the active instance for database group A and for cluster A. Furthermore, the flow of the backup process is changed. This change is indicated by the heavy (darker) line 356, as compared to the heavy line 256 in FIG. 2.

The user provides backup command 346, containing the cluster identifier 348, the instance identifier for the save set 350, the database group identifier 352, and the backup type 354. The command is received at node A-2 316. At backup module 326, preferred node detection module 328 detects that cluster node A-2 is the preferred node. In response, backup module 326 makes a backup of database group A 320 and the databases contained in database group A, such as database i 322. The backup module $C26 labels the backup with the database group identifier as well as the instance identifier provided in the user command 346. The backup is then sent to the backup server 330. In some embodiments, this instance identifier only needs to be provided by the user for the first time a backup is made for a database group. In subsequent backup operations, the system can detect the correct save set which was already previously created for this database group and automatically place new backups in that save set on the backup server 330.

Unlike the flow in FIG. 2 which was described above, node A-1 304 is not involved in the backup operation as it is no longer the preferred node. Thus, there is no need to access the database instance A-1 308. This reduces traffic within the network and allows the backup process to not impact the resources of node A-1. Thus, in the flow described in FIG. 3, no other secondary nodes are impacted by the backup operation.

Note that the primary node and the preferred node are the same in the illustrated embodiments. Thus, when the primary node fails over to a secondary node, the secondary node automatically becomes the primary node and also becomes the preferred backup node, and the backup processing module will back up the new primary node. However, in other embodiments, the primary and preferred nodes are different. In these embodiments, if the primary node fails but is not the preferred backup node, the backup processing module 326 will continue to back up the same preferred (i.e. original) backup node.

FIGS. 4-A and 4-B illustrate exemplary interfaces exposed to a user for the backup system according to one embodiment of the invention. FIG. 4I depicts an exemplary user command 246 entry interface according to one embodiment. In one embodiment, this interface is part of the NetWorker™ (NW) Client with Networker Modules for Microsoft® Applications (NMM), developed by EMC® Corporation of Hopkinton, Mass. In one embodiment, the user has specified the name of the cluster as "MSCSAL-WAYSON.nmmdev.com." The user also specifies the instance name to label the save set with as well as the database group name as "MSSQL$INSTANCEA#AG1."

FIG. 4-B depicts an exemplary graphical user interface for viewing the save set created for database groups according to one embodiment. Here, a single save set is created for database group "AG1" and is labeled with "INSTANCEA" as the instance name. This creates a full save set name of "MSSQL$INSTANCEA#AG1." Note again that while the save set is labeled with an instance name, the save set itself can contain backups from any instance within the database group. When the save set is selected, the set of backups stored in that save set for the database group is listed in tie lower right section of the interface. In this example depiction, two full backups are visible, and multiple "incr," or incremental backups, are visible. These backups are backups of data within the database group. In one embodiment, they are backups of certain portions of data within the database group, such as particular databases within the database group. In other embodiments, these backups are backups of the entire database group. In yet other embodiments, these backups include the transaction logs associated with the backed up database as well.

Note that in the above exemplary interfaces, the user did not need to specify the primary or preferred node to backup from. Instead, the backup system will automatically detect which node to back up from once given the identifying information for the database group, cluster, etc.

Figure 5:
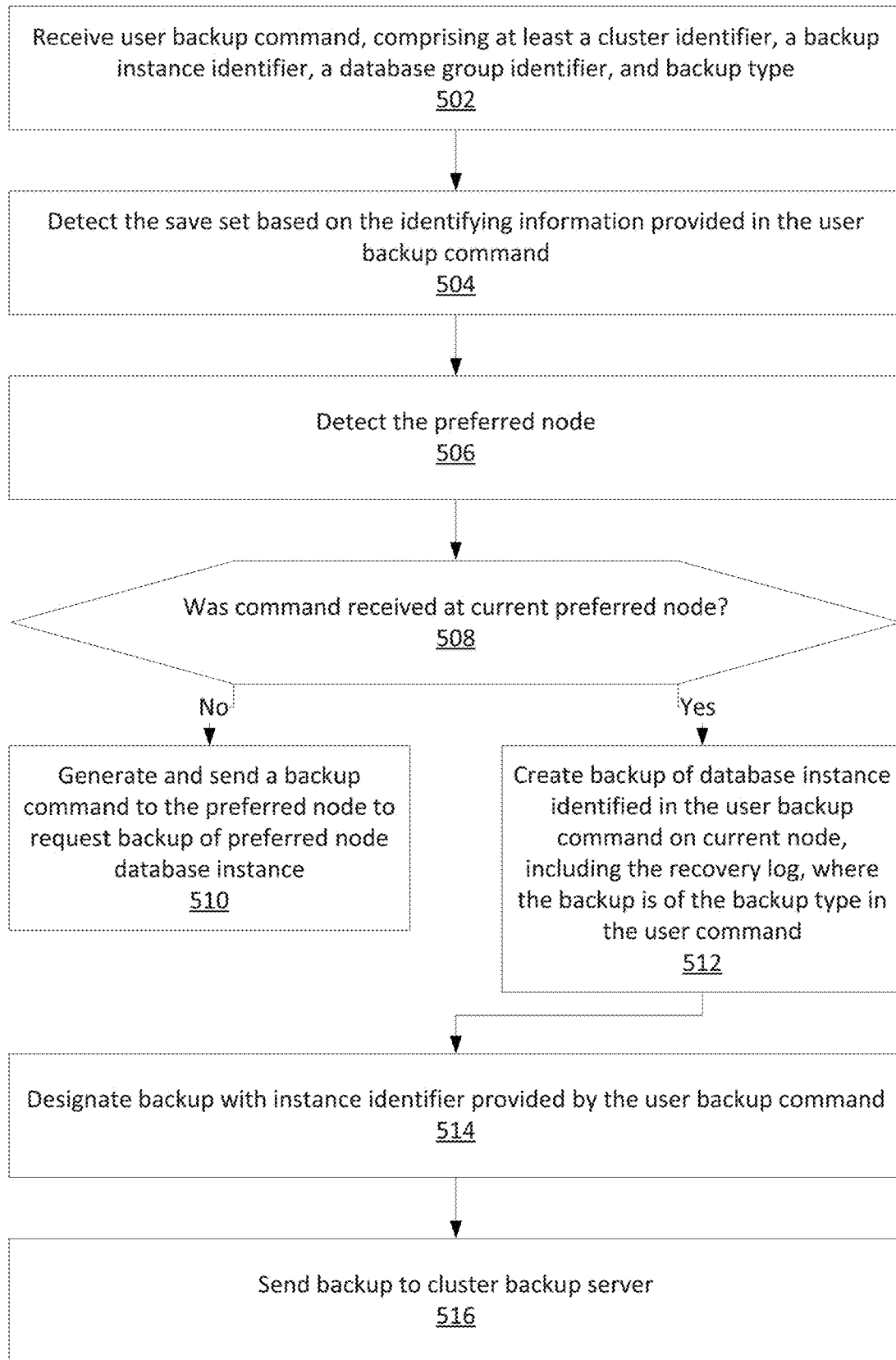
FIG. 5 is a flow diagram illustrating the backup process on one cluster node according to one embodiment of the invention.

FIG. 5 is a flow diagram illustrating the backup process on one cluster node according to one embodiment of the invention. In some embodiments, the flow depicted in FIG. 5 may be performed by the system shown in FIG. 2. At 502, a backup command, such as user backup command 246, is received by a cluster node (e.g. cluster node A-1 204). In some embodiments, the backup command is sent to backup processing module 226. The user backup command is comprised of at least one of a cluster identifier, a backup instance identifier, a database group identifier, and a backup type. In some embodiments, the user backup command additionally specifies databases within the database group to back up. At 504, the cluster node detects the save set based on information in the user backup command. In one embodiment, the user backup command may identify the database instance and the database group in a single identifier. In such an embodiment, the cluster node will parse the user backup command to distinguish between the identifier for the database group and the identifier for the database instance. In some embodiments, the cluster identifier and database group identifier identified in the user command is used to detect the name of the existing save set for the database group. In another embodiment, upon detecting that a save set does not yet exist for the database group, the database group identifier and the backup instance identifier is used to designate a new save set for that database group. In some embodiments, this process is performed in backup processing module 226. The save set contains the backups for a particular database group. It may include backups (e.g. full, incremental, and/or differential backups) of individual databases in the database group, and/or the transaction logs associated with these databases.

At 506, the cluster node detects whether it is the preferred backup instance for the database group. In some embodiments, this is done by querying the database instance on the cluster node, e.g. database instance A-1 220 on cluster node A-2 216. In some embodiments, this process is performed in backup processing module 226. At 508, if the cluster node detects that it is the preferred node, flow proceeds to 512, otherwise flow proceeds to 510.

At 510, when the cluster node detects that it is not the preferred node, the cluster node generates and sends a command to the preferred node to request backup of the active database instance within the preferred node. In some embodiments, this command is 224, and is received at backup processing module 212 for cluster node A-1 204. In some embodiments, this command includes the instance identifier used to label the save set. In other embodiments, the command additionally includes the database group identifier, the cluster identifier, and the backup type requested. In other embodiments, the command also includes the databases within a database group which should be backed up.

In one embodiment, the command is generated by a Networker Modules for Microsoft Applications (NMM) instance on the cluster node and the NMM instance on the cluster node sends this command to the NMM instance on the preferred node. An exemplary generated command is shown below.

"C:\Program Files\EMC NetWorker\nsr\bin\nsrsqlsv. exe -s elangovm2 -g NMSQL_Incr -LL -m MW2K8X64SQL1 -b ELANBKUPPOOL -l full -q -W 78 -z FEDERATED_SLAVE=true -z FEDINDEX_NAME=MSSQL$INSTANCE_14 -z FEDCLIENT_NAME=MSCSALWAYSON -N MSSQL$INSTANCE_255#AG_255 MSSQL$INSTANCE_255:Testg239 MSSQL$INSTANCE_255: AlwaysONDB"

In this generated command, the backup instance label is set to "INSTANCE 14" and is submitted using the option FEDINDEX_NAME. The backup type is "full" and is selected via option "4." The cluster name is "MSCSAL-WAYSON" and is submitted via option "FEDCLIENT_NAME." The preferred or primary node (i.e. the destination node) is "INSTANCE_255," and the selected databases is "AlwaysONDB" and "Testg239" and are indicated by the option "-N."

At 512, the cluster node has determined that it is the preferred node. The cluster node then creates a backup of the database group or database requested by the user command from the data stored in the database instance on the cluster node, e.g. database i 322 in database group A 320 within database server instance A-2 318 within cluster node A-2 316. The cluster node also backs up the transaction or recovery log for the associated database or database group as well. In some embodiments, this backup operation is performed by the backup processing module 226.

At 514, the backup is designated with the instance identifier provided by the user backup command. For example, if the user provided "Instance A-1" as the backup instance name, and the database group name is "Group A" then the backup would be designated with the save set identifier (e.g. name) of "Group A/Instance A-1." In some embodiments, the cluster node, upon detecting that a save set already exists for the database group indicated in the user backup command, uses the existing save set identifier for that database group. Note that regardless of which instance the backup is made from, all backups for a database group are backed up to and indexed against a single save set.

At 516, the backup is sent to the cluster backup server. In some embodiments, the cluster backup server is 230. In some embodiments, the backup server instead spawns a slave process or thread on the cluster node to create the backup, in response to a user backup command sent to the cluster node and transmitted to the backup server. This slave process accesses or logs into the database instance to create the backup and returns the backup to the backup server after the backup is made. In other embodiments, the user backup command is received directly at the backup server, and after receiving the backup command, the backup server spawns the slave process on the primary active cluster node to back up the requested database or database group.

FIG. 6 is a flow diagram illustrating the receipt of a generated backup command on one cluster node according to one embodiment of the invention. At 602, the preferred cluster node receives a generated backup command from a secondary cluster node. In some embodiments, this generated backup command is 224. In some embodiments, the preferred cluster node is 204 and the secondary cluster node is 216. The generated backup command comprises at least a cluster identifier, a database group identifier, a backup type, and optionally a backup instance identifier. The backup command may also additionally indicate a particular database or databases within the database group to back up.

At 604, the preferred cluster node detects the save set based on information in the generated backup command. In some embodiments, the cluster identifier and database group identifier identified in the user command is used to detect the identifier (e.g. name) for the existing save set for the database group. In another embodiment, upon detecting that a save set does not yet exist for the database group, the database group identifier and the backup instance identifier is used to designate a new save set for that database group. In some embodiments, this process is performed in backup processing module 212.

At 606, the primary cluster node creates a backup of the database group or database requested by the generated backup command from the data stored in the database instance on the cluster node. The cluster node also backs up the transaction or recovery log as well. In some embodiments, this backup operation is performed by the backup processing module 212.

At 608, the backup is designated with the instance name provided by the generated backup command. For example, if the generated command provided "Instance A-1" as the backup instance name, and the database group name is "Group A," then the backup would be designated with the save set name of "Group A/Instance A-1." In some embodiments, the cluster node, upon detecting that a save set already exists for the database group indicated in the user backup command, uses the existing save set name for that database group. Note that regardless of which instance the backup is made from, all backups for a database group are backed up to a single save set.

At 610, the backup is sent to the cluster backup server. In some embodiments, the cluster backup server is 230. In some embodiments, the backup server instead spawns a slave process on the cluster node to create the backup, in response to a user backup command sent to the cluster node and transmitted to the backup server. This slave process returns the backup to the backup server after the backup is made.

Figure 7:
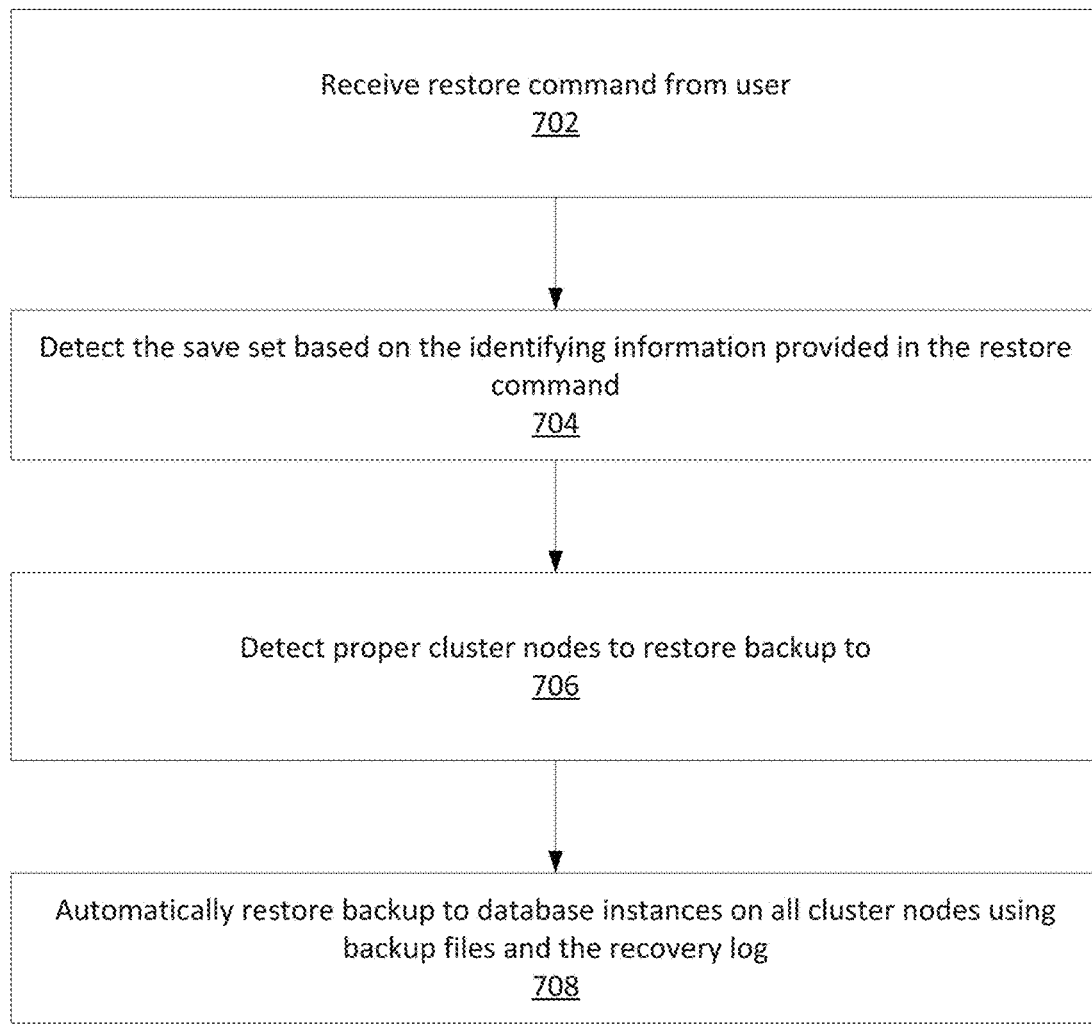
FIG. 7 is a flow diagram illustrating the restoration of a backup according to one embodiment of the invention.

FIG. 7 is a flow diagram illustrating the restoration of a backup according to one embodiment of the invention. At 702, a cluster node receives a restore command from the user. In some embodiments, the cluster node is 216. In other embodiments, the restore command is received by the backup server 230 instead. In other embodiments, the restore command is automatically generated by a disaster recovery or other automated system. The restore command indicates the database or database group which the user or recovery system wishes to restore to the cluster.

At 704, the cluster node detects the proper save set which contains the backup using the information contained in the restore command. For example, if the restore command indicates database group A, the cluster node searches the cluster backup server for the database group A save set. If the restore command further indicates a particular database within the database group, the cluster node identifies the backup of the database within the save set of the database group.

At 706, the cluster node identifies the proper cluster nodes to restore the backup to. This information may be saved within the save set. At 708, the cluster node restores the backup to the proper database instances on the proper cluster nodes. During restoration, any available full, incremental, or differential backups may be restored. Furthermore, the recovery log is applied to the restored database so that the database is restored to a particular sequence number or timestamp. All restored databases on all database instances are restored using this method so that the restored sequence number or timestamps match. This allows all the restored databases on each cluster node to be exact replicas of each other.

Figure 8:
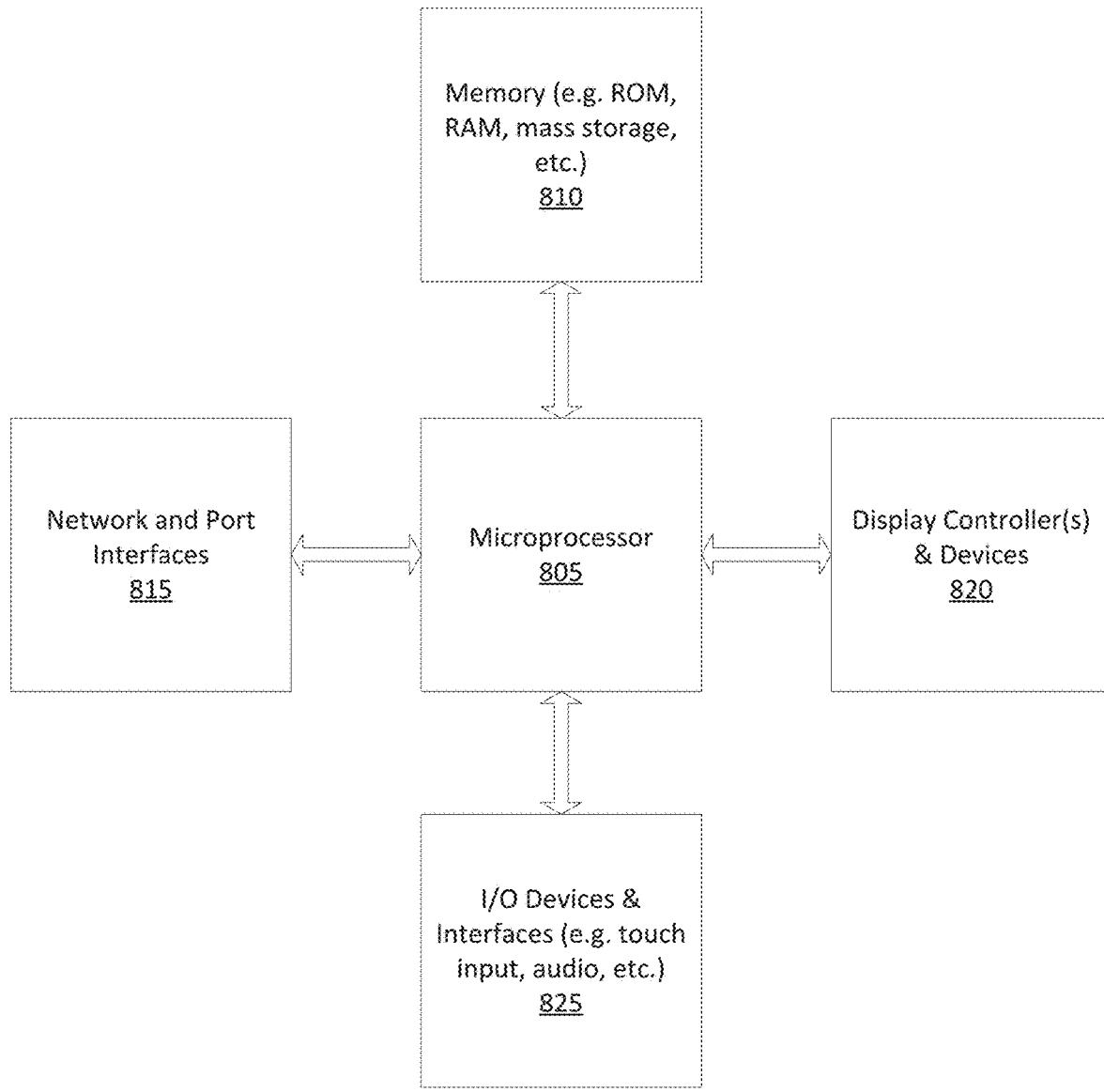
FIG. 8 illustrates, in block diagram form, an example of a processing system according to one embodiment of the invention.

FIG. 8 illustrates, in block diagram form, an exemplary processing system 800 such as a cluster node (e.g. cluster node 204) or backup server (e.g. backup server 230). Data processing system 800 includes one or more microprocessors 805 and connected system components (e.g., multiple connected chips). Alternatively, data processing system 800 is a system on a chip.

Data processing system 800 includes memory 810, which is coupled to microprocessor(s) 805. Memory 810 may be used for storing data, metadata, and programs for execution by the microprocessor(s) 805. For example, memory 810 may include one or more of the data stores 810 and/or may store modules described herein. Memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 810 may be internal or distributed memory.

Data processing system 800 includes network and port interfaces 815, such as a port, connector for a dock, or a connector for a USB interface, FireWire, Thunderbolt, Ethernet, Fibre Channel, etc. to connect the system 800 with another device, external component, or a network. Exemplary network and port interfaces 815 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 800 with another device, external component, or a network and receive stored instructions, data, tokens, etc.

Data processing system 800 also includes display controller and display device 820 and one or more input or output ("I/O") devices and interfaces 825. Display controller and display device 820 provides a visual user interface for the user. I/O devices 825 allow a user to provide input to, receive output from, and otherwise transfer data to and from the system. I/O devices 825 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 8.

Data processing system 800 is an exemplary representation of one or more of the devices described above. Data processing system 800 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 800 may be a network computer, server, or an embedded processing device within another device or consumer electronic product. As used herein, the terms computer, device, system, processing system, processing device, and "apparatus comprising a processing device" may be used interchangeably with data processing system 800 and include the above-listed exemplary embodiments.

Additional components, not shown, may also be part of data processing system 800, and, in certain embodiments, fewer components than that shown in FIG. 8 may also be used in data processing system 800. It will be apparent from this description that aspects of the inventions may be embodied, at least in part, in software. That is, the computer-implemented method(s) may be carried out in a computer system or other data processing system 800 in response to its processor or processing system 805 executing sequences of instructions contained in a memory, such as memory 810 or other non-transitory machine-readable storage medium. The software may further be transmitted or received over a network (not shown) via network interface device 815. In various embodiments, hardwired circuitry may be used in combination with the software instructions to implement the present embodiments. Thus, the techniques are not limited to any specific combination of hardware circuitry and software, or to any particular source for the instructions executed by data processing system 800.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for creating data backups, comprising:

receiving, at a first cluster node running a first database instance of a first database group, a first backup command, the first database group being associated with the first database instance running on the first cluster node and a second database instance running on a second cluster node, wherein the first backup command specifies a cluster backup server for use in storing data backups from the first database group, wherein the data backups are to be stored in a save set on the cluster backup server, the save set being associated with the first database group and identified by a particular label specified in the first backup command;

determining that the first database instance on the first cluster node is acting as an active database instance for the first database group;

performing a backup operation on the first database instance to generate a first data backup for the first database group, in response to determining that the first database instance is acting as the active database instance for the first database group, wherein the first data backup is to be stored in a constant database instance of the save set on the cluster backup server;

receiving, at the first cluster node of the first database group, a second backup command to create a second data backup for the first database group, the second backup command specifying the save set on the cluster backup server to store the second data backup for the first database group;

detecting that the first database instance on the first cluster node has -stopped acting as the active database instance for the first database group and that the second database instance on the second cluster node is no longer acting as a failover database instance but is acting as the active database instance for the first database group, wherein the first database group includes a single active database instance and one or more failover database instances;

generating, by the first cluster node, a third backup command that includes the particular label specified by the second backup command; and transmitting, by the first cluster node, the generated third backup command to the second cluster node to request the second cluster node to back up the second database instance to the cluster backup server without having to back up the first database instance; wherein in response to receiving the generated third backup command by the second cluster node, backing up, by the second cluster node, the second database instance running thereon, to the same constant database instance associated with the save set on the cluster backup server previously backed up from the first database instance.

2. The computer-implemented method of claim 1, wherein the first backup command comprises at least a cluster identifier, a backup instance identifier, an identifier of the first database group, and a backup type.

3. The computer-implemented method of claim 2, wherein the first data backup on the cluster backup server is associated with the identifier for the first database group and the backup instance identifier for all backups made for the first database group; and wherein a backup operation of a plurality of recovery logs is performed for the first database group.

4. The computer-implemented method of claim 2, further comprising:

receiving a fourth backup command at the first cluster node from a third cluster node, wherein the third backup command indicates that the first database instance on the first cluster node is currently acting as an active database instance for a different database group;

in response to the fourth backup command, performing a backup operation on the different database group from the first cluster node to the cluster backup server.

5. The computer-implemented method of claim 4, wherein performing the backup operation further comprises:

associating a data backup on the cluster backup server created by the backup operation on the different database group with the identifier for the different database group and a backup instance identifier provided in the generated second backup command; and performing a backup operation of a plurality of recovery logs for the different database group.

6. The computer-implemented method of claim 2, wherein the backup type is a full, incremental, or differential backup type.

7. The computer-implemented method of claim 6, further comprising:

receiving a restore command from a user at the first cluster node for the first database group;

detecting a correct backup set for the first database group in the cluster backup server based on identifying information provided in the restore command;

restoring the first database group on to the first cluster node using a plurality of backup files and recovery log files located in a correct backup set; and restoring the first database group on to a plurality of other clusters to which the first database group is designated to reside in.

8. A non-transitory computer-readable medium having computer instructions stored therein, wherein the computer instructions are provided for creating data backups, wherein the computer instructions, when executed by a processor, cause the processor to perform operations comprising:

receiving, at a first cluster node running a first database instance of a first database group, a first backup command, the first database group being associated with the first database instance running on the first cluster node and a second database instance running on a second cluster node, wherein the first backup command specifies a cluster backup server for use in storing data backups from the first database group, wherein the data backups are to be stored in a save set on the cluster backup server, the save set is associated with the first database group and the save set is identified by a particular label specified in the first backup command;

determining that the first database instance on the first cluster node is acting as an active database instance for the first database group;

performing a backup operation on the first database instance to generate a first data backup for the first database group, in response to determining that the first database instance is acting as the active database instance for the first database group, wherein the first data backup is to be stored in a constant database instance of the save set on the cluster backup server;

receiving, at the first cluster node of the first database group, a second backup command to create a second data backup for the first database group, the second backup command specifying the save set on the cluster backup server to store the second data backup for the first database group;

detecting that the first database instance on the first cluster node has stopped acting as the active database instance for the first database group and that the second database instance on the second cluster node is no longer acting as a failover database instance but is acting as the active database instance for the first database group, wherein the first database group includes a single active database instance and one or more failover database instances;

generating, by the first cluster node, a third backup command that includes the particular label specified by the second backup command; and transmitting, by the first cluster node, the generated third backup command to the second cluster node to request the second cluster node to back up the second database instance to the cluster backup server without having to back up the first database instance; wherein in response to receiving the generated third backup command by the second cluster node, backing up, by the second cluster node, the second database instance running thereon, to the same constant database instance associated with the save set on the cluster backup server previously backed up from the first database instance.

9. The non-transitory computer-readable medium of claim 8, wherein the first backup command comprises at least a cluster identifier, a backup instance identifier, an identifier of the first database group, and a backup type.

10. The non-transitory computer-readable medium of claim 9, wherein the first data backup on the cluster backup server is associated with the identifier for the first database group and the backup instance identifier for all backups made for the first database group; and wherein a backup operation of a plurality of recovery logs is performed for the first database group.

11. The non-transitory computer-readable medium of claim 9, wherein the operations further comprise:
receiving a fourth backup command at the first cluster node from a third cluster node, wherein the third backup command indicates that the first database instance on the first cluster node is currently acting as an active database instance for a different database group;
in response to the fourth backup command, performing a backup operation on the different database group from the first cluster node to the cluster backup server.

12. The non-transitory computer-readable medium of claim 11, wherein performing the backup operation further comprises:
associating a data backup on the cluster backup server created by the backup operation on the different database group with the identifier for the different database group and a backup instance identifier provided in the generated second backup command; and
performing a backup operation of a plurality of recovery logs for the different database group.

13. The non-transitory computer-readable medium of claim 9, wherein the backup type is a full, incremental, or differential backup type.

14. The non-transitory computer-readable medium of claim 13, wherein the operations further comprise:
receiving a restore command from a user at the first cluster node for the first database group;
detecting a correct backup set for the first database group in the cluster backup server based on identifying information provided in the restore command;
restoring the first database group on to the first cluster node using a plurality of backup files and recovery log files located in a correct backup set; and
restoring the first database group on to a plurality of other clusters to which the first database group is designated to reside in.

15. A data processing system, comprising:
a processor; and
a memory coupled to the processor for storing instructions, wherein the instructions are provided for creating data backups, wherein the instructions, when executed by a processor, cause the processor to perform operations comprising:
receiving, at a first cluster node running a first database instance of a first database group, a first backup command, the first database group being associated with the first database instance running on the first cluster node and a second database instance running on a second cluster node, wherein the first backup command specifies a cluster backup server for use in storing data backups from the first database group, wherein the data backups are to be stored in a save set on the cluster backup server, the save set being associated with the first database group and identified by a particular label specified in the first backup command;
determining that the first database instance on the first cluster node is acting as an active database instance for the first database group;
performing a backup operation on the first database instance to generate a first data backup for the first database group, in response to determining that the first database instance is acting as the active database instance for the first database group, wherein the first data backup is to be stored in the save set on the cluster backup server;
receiving, at the first cluster node of the first database group, a second backup command to create a second data backup for the first database group, the second backup command specifying the save set on the cluster backup server to store the second data backup for the first database group;
detecting that the first database instance on the first cluster node has stopped acting as the active database instance for the first database group and that the second database instance on the second cluster node is no longer acting as a failover database instance but is acting as the active database instance for the first database group, wherein the first database group includes a single active database instance and one or more failover database instances;
generating, by the first cluster node, a third backup command that includes the particular label specified by the second backup command; and
transmitting, by the first cluster node, the generated third backup command to the second cluster node to request the second cluster node to back up the second database instance to the cluster backup server without having to back up the first database instance; wherein
in response to receiving the generated third backup command by the second cluster node, backing up, by the second cluster node, the second database instance running thereon, to the same constant database instance associated with the save set on the cluster backup server previously backed up from the first database instance.

16. The data processing system of claim 15, wherein the first backup command comprises at least a cluster identifier, a backup instance identifier, an identifier of the first database group, and a backup type.

17. The data processing system of claim 16, wherein the first data backup on the cluster backup server is associated with the identifier for the first database group and the backup instance identifier for all backups made for the first database group; and wherein a backup operation of a plurality of recovery logs is performed for the first database group.

18. The data processing system of claim 16, wherein the processor is further caused to:
receiving a fourth backup command at the first cluster node from a third cluster node, wherein the third backup command indicates that the first database instance on the first cluster node is currently acting as an active database instance for a different database group;

in response to the fourth backup command, performing a backup operation on the different database group from the first cluster node to the cluster backup server.

19. The data processing system of claim 18, wherein to perform the backup operation is further operative to:

associate a data backup on the cluster backup server created by the backup operation on the different database group with the identifier for the different database group and a backup instance identifier provided in the generated second backup command; and perform a backup operation of a plurality of recovery logs for the different database group.

20. The data processing system of claim 16, wherein the backup type is a full, incremental, or differential backup type.

21. The data processing system of claim 20, wherein the operations further comprise:

receiving a restore command from a user at the first cluster node for the first database group;

detecting a correct backup set for the first database group in the cluster backup server based on identifying information provided in the restore command;

restoring the first database group on to the first cluster node using a plurality of backup files and recovery log files located in a correct backup set; and restoring the first database group on to a plurality of other clusters to which the first database group is designated to reside in.

* * * * *